United States Patent
Kling et al.

(10) Patent No.: US 10,094,282 B2
(45) Date of Patent: Oct. 9, 2018

(54) SPINNER AFT-EXTENDED FORWARD RETURN FLANGE

(71) Applicant: UNITED TECHNOLOGIES CORPORATION, Farmington, CT (US)

(72) Inventors: Colin J. Kling, Middletown, CT (US); Darin S. Lussier, Guilford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 112 days.

(21) Appl. No.: 14/693,488

(22) Filed: Apr. 22, 2015

(65) Prior Publication Data

US 2016/0032831 A1 Feb. 4, 2016

Related U.S. Application Data

(60) Provisional application No. 62/030,931, filed on Jul. 30, 2014.

(51) Int. Cl.
*B64C 11/14* (2006.01)
*F02C 7/04* (2006.01)
(Continued)

(52) U.S. Cl.
CPC .............. *F02C 7/04* (2013.01); *B29C 43/021* (2013.01); *B64C 11/14* (2013.01); *F02C 3/04* (2013.01); *B29C 2043/026* (2013.01); *B29K 2101/00* (2013.01); *B29L 2031/7504* (2013.01); *F05D 2220/32* (2013.01); *F05D 2230/30* (2013.01);
(Continued)

(58) Field of Classification Search
CPC ...... B64D 29/06; B64D 2033/022; F02C 7/04; F02C 7/047; F02K 3/06; B64C 1/10; B64C 11/14; B64C 11/04–11/12; F05D 2220/36; F05D 2240/90; F05D 2260/30; F01D 5/02–5/10; F01D 25/243
See application file for complete search history.

(56) References Cited

U.S. PATENT DOCUMENTS 2,297,226 A * 9/1942 Muller-Keuth ......... B64C 11/14
416/245 R
2,328,185 A * 8/1943 Benson .................. B64C 11/14
416/245 R
(Continued)

FOREIGN PATENT DOCUMENTS

CA 2881861 A1 3/2014

OTHER PUBLICATIONS

The American Heritage Dictionary of the English Language—definition of spinner.*
(Continued)

*Primary Examiner* — Gerald L Sung
*Assistant Examiner* — Rene Ford
(74) *Attorney, Agent, or Firm* — Cantor Colburn LLP

(57) ABSTRACT

A spinner for a fan assembly of a gas turbine engine, a method of fabricating a spinner for a fan assembly of a gas turbine engine, and a gas turbine engine are disclosed. The fan section may include a nosecap. The spinner may include a forward end, an aft end, and a return flange associated with the forward end. The return flange may include a forward flange extending forward towards the nosecap and an aft flange extending aft towards the aft end.

15 Claims, 5 Drawing Sheets

(51) Int. Cl.
*B29C 43/02* (2006.01)
*F02C 3/04* (2006.01)
*B29K 101/00* (2006.01)
*B29L 31/00* (2006.01)

(52) U.S. Cl.
CPC ...... *F05D 2240/20* (2013.01); *F05D 2240/35* (2013.01); *F05D 2300/43* (2013.01); *Y02T 50/671* (2013.01)

(56) References Cited

U.S. PATENT DOCUMENTS

| | | | | |
|---|---|---|---|---|
| 2,336,256 A * | 12/1943 | Junger | ............... | B64C 11/14 |
| | | | | 416/245 R |
| 2,371,801 A * | 3/1945 | Chester | ............... | B64C 11/14 |
| | | | | 220/327 |
| 2,375,673 A * | 5/1945 | Marshall | ............... | B64C 11/14 |
| | | | | 416/245 R |
| 2,394,749 A * | 2/1946 | Chester | ............... | B64C 11/14 |
| | | | | 285/189 |
| 2,594,118 A | 4/1952 | Boyd | | |
| 2,848,054 A * | 8/1958 | Pearl | ............... | B64C 11/14 |
| | | | | 416/94 |
| 3,834,157 A | 9/1974 | Hoffman | | |
| 5,281,096 A * | 1/1994 | Harris | ............... | F01D 11/008 |
| | | | | 416/193 A |
| 5,573,378 A * | 11/1996 | Barcza | ............... | B64C 11/14 |
| | | | | 411/175 |
| 6,217,283 B1 * | 4/2001 | Ravenhall | ............... | F01D 5/225 |
| | | | | 415/9 |
| 6,358,014 B1 * | 3/2002 | Chou | ............... | B64C 11/14 |
| | | | | 29/889.1 |
| 8,215,910 B2 * | 7/2012 | Belmonte | ............... | B64C 11/14 |
| | | | | 416/144 |
| 8,251,670 B2 * | 8/2012 | Anghileri | ............... | B64D 33/02 |
| | | | | 416/245 R |
| 8,753,094 B2 * | 6/2014 | Bottome | ............... | F04D 29/321 |
| | | | | 416/245 R |
| 2008/0279688 A1 | 11/2008 | Jensen et al. | | |
| 2011/0103726 A1 * | 5/2011 | Xie | ............... | F01D 5/06 |
| | | | | 384/295 |
| 2013/0202449 A1 * | 8/2013 | Lombard | ............... | F01D 5/02 |
| | | | | 416/244 R |
| 2013/0255277 A1 * | 10/2013 | Macchia | ............... | F02C 7/04 |
| | | | | 60/805 |
| 2014/0186187 A1 * | 7/2014 | Lamboy | ............... | F01D 5/3007 |
| | | | | 416/219 R |
| 2015/0226116 A1 | 8/2015 | Major et al. | | |

OTHER PUBLICATIONS

The American Heritage Dictionary of the English Language—definition of fairing.*
The American Heritage Dictionary of the English Language—definition of hub.*
EP Search Report for Application No. 15179032.6; dated Dec. 22, 2015; 7 pgs.

* cited by examiner

SPINNER AFT-EXTENDED FORWARD RETURN FLANGE

This application claims priority under 35 USC § 119(e) to US Provisional Patent application Ser. No. 62/030,931 filed on Jul. 30, 2014.

TECHNICAL FIELD OF THE DISCLOSURE

Background of the Disclosure

In a gas turbine engine, the spinner of the fan section is designed to direct local flow into the root of the fan blades. The spinner may be designed to minimize foreign object damage, such as impact forces caused by hail and bird strikes. Additionally, the spinner may be designed to minimize bill of material object damage, which is damage caused by components of the engine itself. Per Federal Aviation Administration (FAA) regulations, the gas turbine engine must be designed to meet given continued operation requirements after foreign object strikes to the fan, including the spinner. Additionally, increased durability of the gas turbine engine and the spinner itself is beneficial to the owner because the reduced wear and tear on the engine may contribute to lower repair costs and greater efficiency.

As such, a spinner of the fan section of the gas turbine engine may be designed with a support flange (e.g., a Y-flange or a support ring) aft of the nose of the spinner. The support flange may transfer axial compressive forces from strikes to the spinner, transfer shear forces due to rotational acceleration and deceleration, and/or may transfer radial forces imparted due to thermal and/or centrifugal expansion. Said support flange may be located between the spinner of the fan section and a fan hub of the fan section.

In addition to the aft-located support flange, the spinner may also include a return flange at the forward end of the spinner. Return flanges are designed to add further resistance to foreign object impact events, such as bird strikes. The return flange can be located where the nosecap of the spinner and the forward end of the spinner meet and may connectively interact with the nosecap. Prior known return flanges include flanges of the forward end of the spinner section which extend outwardly in the forward direction towards the nosecap.

In some other gas turbine engine designs, the return flange is replaced, functionally, by a metallic ring affixed to the forward end of the spinner section. The use of a metallic ring in place of a return flange may improve foreign object resistance, but may also add unwanted cost for production. Further, a metallic ring at the forward end of the spinner may add unnecessary, excess weight to the spinner.

While the prior return flanges and/or metallic rings may provide adequate resistance to foreign object damage and bird strikes, improvements to engine durability and safety are incredibly important and valuable. As such, an improved return flange is needed to improve resistance of the spinner during foreign object events at low cost and without adding prohibitive excess weight to the spinner.

SUMMARY OF THE DISCLOSURE

In accordance with one aspect of the disclosure, a spinner for a fan section of a gas turbine engine is disclosed. The fan section may include a nosecap. The spinner may include a forward end, an aft end, and a return flange associated with the forward end. The return flange may include a forward flange extending forward towards the nosecap and an aft flange extending aft towards the aft end.

In a refinement, the aft flange may provide an internal interface, the internal interface extending radially about an internal circumference of the spinner.

In a further refinement, the spinner may further include an internal geometric support, the internal geometric support located at the internal interface.

In an even further refinement, the internal geometric support may be a gusset plate associated with the aft flange.

In a refinement, the forward flange may be configured to interface with the nosecap at a nosecap interface.

In a further refinement, the nosecap interface may be configured to limit forward extension of the forward flange.

In a refinement, the return flange may be formed using a compression molding process.

In accordance with another aspect of the disclosure, a method for fabricating a spinner for a fan section of a gas turbine engine is disclosed. The spinner may include a forward end, an aft end, and a return flange associated with the forward end. The method may include forming a forward flange of the return flange, the forward flange extending towards a nosecap of the fan section, and forming an aft flange of the return flange, the aft flange extending aft toward the aft end.

In a refinement, the forming of the forward flange may be performed using a compression molding process.

In a refinement, the forming of the aft flange may be performed using a compression molding process.

In a refinement, the method may further include forming an internal geometric support on an internal interface of the aft flange, the internal interface extending radially about an internal circumference of the spinner.

In a further refinement, the internal geometric support may be a gusset plate associated with the aft flange.

In a refinement, the method may further include configuring the forward flange to interface with the nosecap at a nosecap interface.

In a further refinement, the nose cap interface may be configured to limit forward extension of the forward flange.

In accordance with yet another aspect of the disclosure, a gas turbine engine is disclosed. The gas turbine engine may include a fan assembly section, a compressor section downstream of the fan assembly section, a combustor section downstream of the compressor section, and a turbine section downstream of the combustor section. The fan assembly section may include a nosecap and a spinner, the spinner including a forward end, an aft end and a return flange associated with the forward end. The return flange may include a forward flange extending forward towards the nosecap and an aft flange extending aft towards the aft end.

In a refinement, the spinner may further include an internal geometric support, the internal geometric support located at an internal interface location provided by the return flange.

In a further refinement, the internal geometric support may be a gusset plate associated with the aft flange.

In a refinement, the spinner may include geometry to facilitate mating the nosecap with the forward flange.

In a further refinement, the nosecap interface may be configured to limit forward extension of the forward flange.

In a refinement, at least one of the forward flange and the aft flange may be formed using a compression molding process.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE DISCLOSURE

Figure 1:
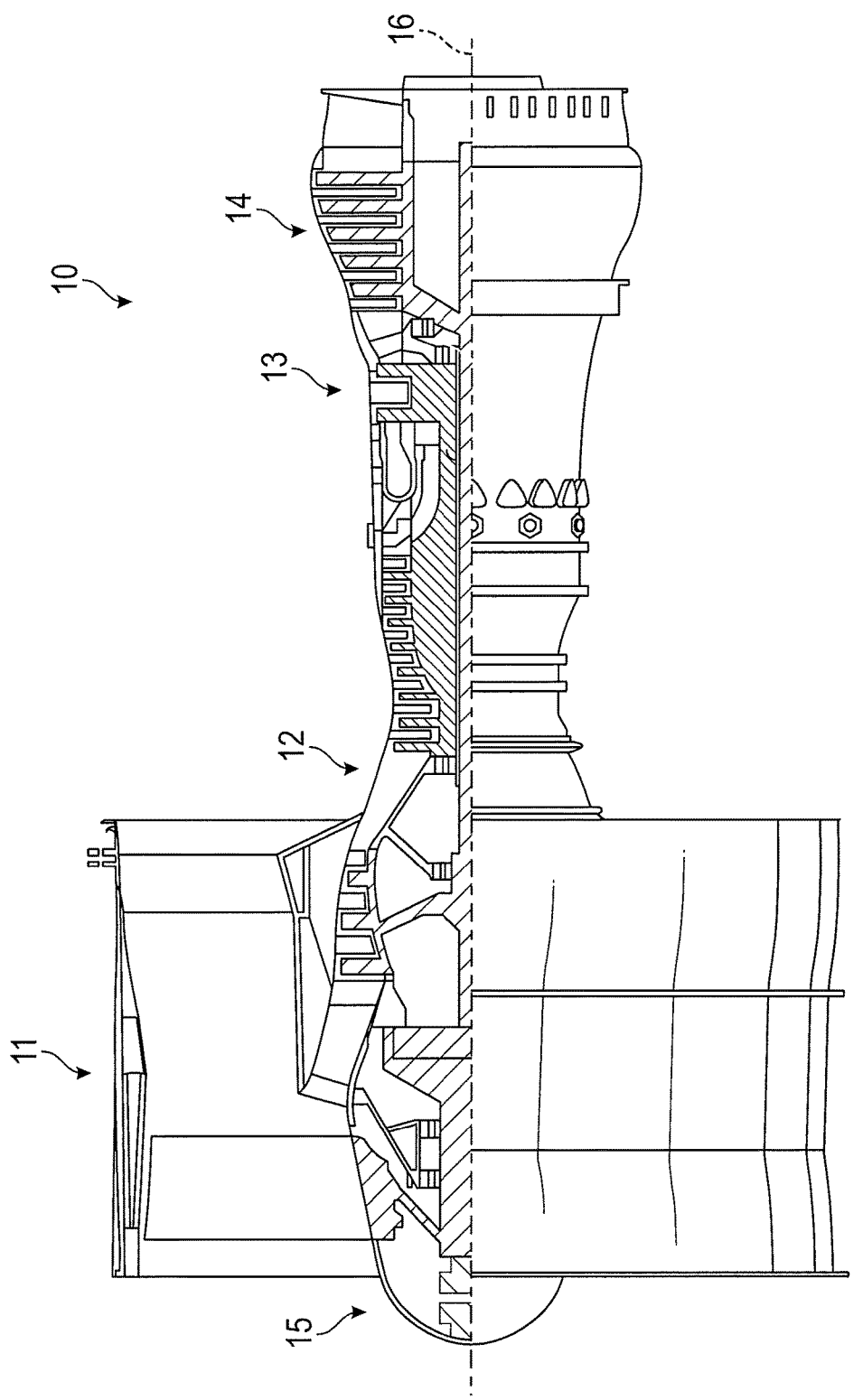
FIG. 1 is side view in partial of a gas turbine engine constructed in accordance with the present disclosure.

Referring to the drawings, and with specific reference to FIG. 1, a gas turbine engine constructed in accordance with the present disclosure is generally referred to by reference numeral 10. Such a gas turbine engine 10 can be used for any number of different applications including, but not limited to, generation of aircraft thrust and land-based power. Moreover, it is to be understood that the sectional view provided in FIG. 1 is included simply to provide a basic understanding of the various sections in a gas turbine engine, and not to limit the invention thereto. The present disclosure extends to all types of gas turbine engines used in all types of applications.

The gas turbine engine 10 may have a fan section 11, the fan section 11 drawing in ambient air and directing the ambient air to a compressor section 12. The incoming air is greatly compressed by the compressor section 12 and directed to a combustor section 13 where it is mixed with fuel and combusted. The products of that combustion, in the form of very hot and expanding gases, are directed to a turbine section 14 shown to be downstream of the combustor section 13. The turbine section 14 and/or compressor section 12 may each be comprised of a plurality of blades radially extending from a shaft forming rotating sections or rotors. A plurality of vanes may radially extend inwardly from a static section or stator, and are intermeshed with the plurality of blades. In so doing, it can be seen that the turbine section 14, compressor section 12, spinner 15 and fan 11 all revolve around a central engine axis 16.

Figure 2:
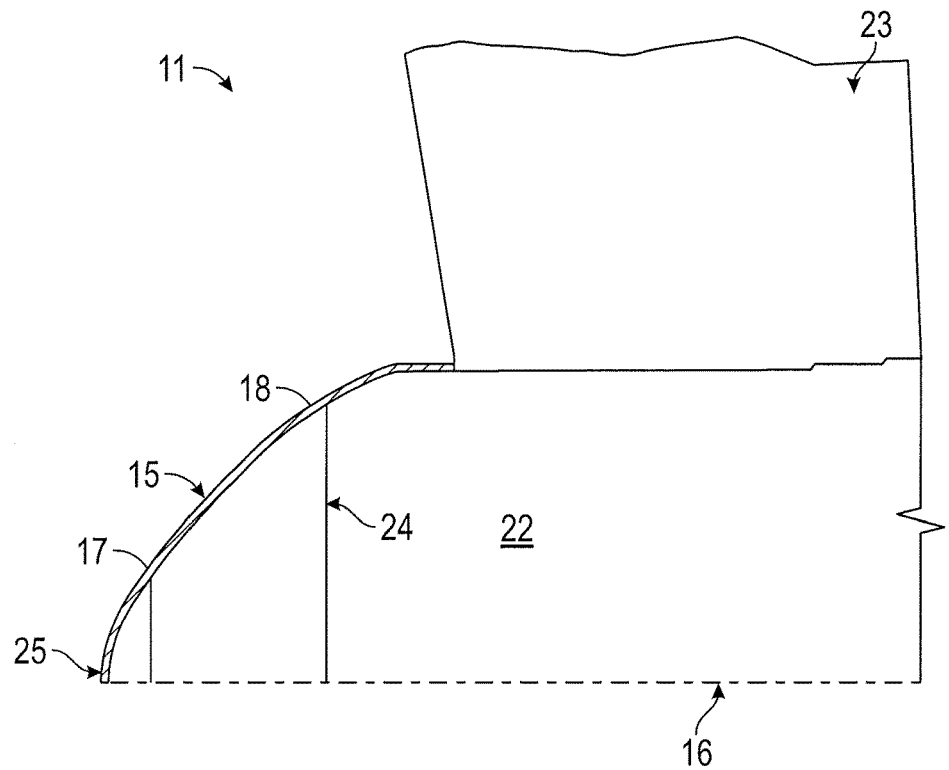
FIG. 2 is a cross-sectional view of a fan and a fan spinner of the gas turbine engine of FIG. 1 constructed in accordance with the present disclosure.

Further, FIG. 2 illustrates a cross-sectional view of a fan section 11 of the gas turbine engine 10 of FIG. 1. The fan section 11 includes a series of radially extending fan blades 23. At the forward-most portion of the fan section is a spinner 15, which may be operatively associated with an aft fan hub section 22. A support structure 24 may be included aft of the spinner 15 and adjacent to the fan hub section 22. The support structure 24 may be a solid component extending radially and covering the entire radial area of the interior of the aft end of the spinner 24. Example implementations for the support structure 24 may be one of a Y-flange, a support ring, and the like.

The spinner 15 has an aft end 18 and a forward end 17. The aft end may be operatively associated with the fan hub 22 and/or the support structure 24. At the forward end 17 of the spinner 15, the forward end 17 interfaces with a nosecap 25. Once interfaced, the spinner 15 and nosecap 25 may be fastened using any appropriate fastening means known in the art. One or more flanges may be present at the forward end 17 of the spinner 15, as detailed below with reference to FIG. 3.

Figure 3:
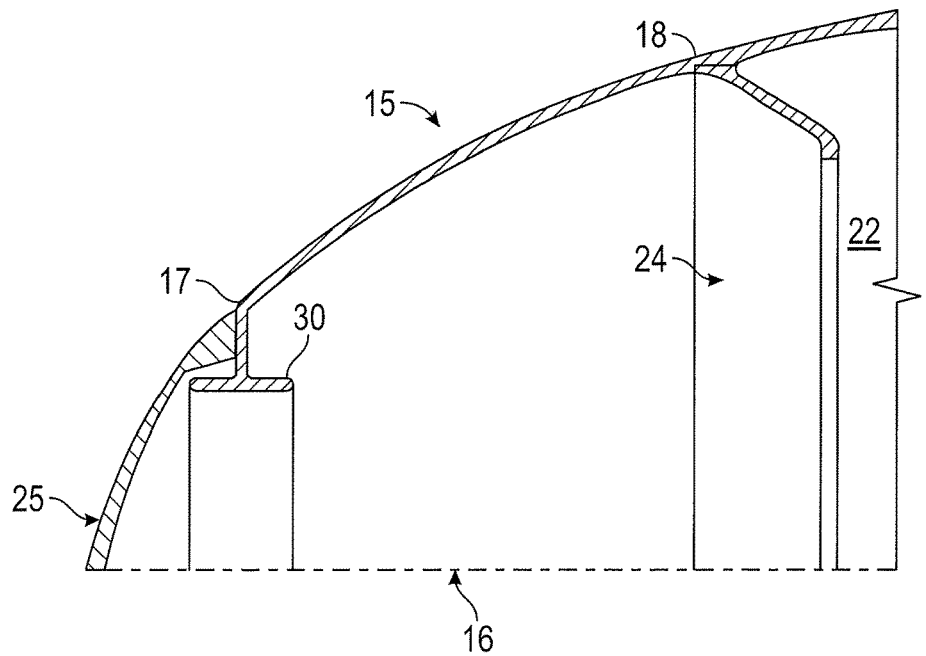
FIG. 3 is an enlarged cross-sectional view of the fan spinner of FIG. 2, wherein the fan spinner includes a return flange.

Turning now to FIG. 3, a cross-sectional view of the spinner 15 is shown. The spinner 15 may include a return flange 30. The return flange 30 and its relevant features are shown in greater detail in the magnified views of the forward end 17 of the spinner 15 in FIGS. 4 and 5.

The return flange 30 includes both a forward flange 34 and an aft flange 32. The forward flange 34 extends forward, toward the nosecap 25. Further the nosecap 25 may be designed having a nosecap interface 36 for interfacing with the forward flange 34. The nosecap interface 36 may be designed to limit forward extension of the forward flange 34 during operation of the gas turbine engine 10. The forward flange 34 provides support for the spinner 15 during foreign object strikes while also, optionally, providing interface for the nosecap 25. The nosecap 25 and the spinner 15 may be connected at the connection interface 35, wherein the nosecap 25 and spinner 15 may be fastened by any suitable means for fastening known in the art (e.g., a bolt).

Figure 4:
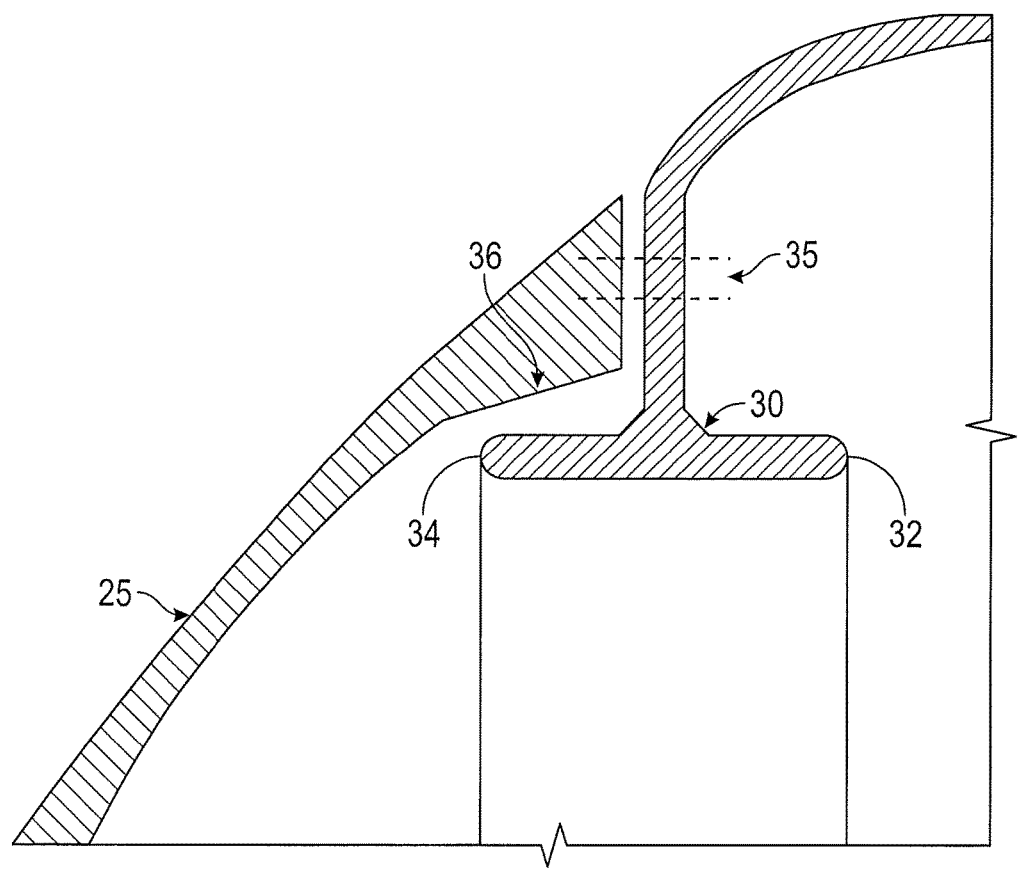
FIG. 4 is a cross-sectional view of a forward end of the fan spinner and nosecap of the fan spinner of FIG. 2.
Figure 5:
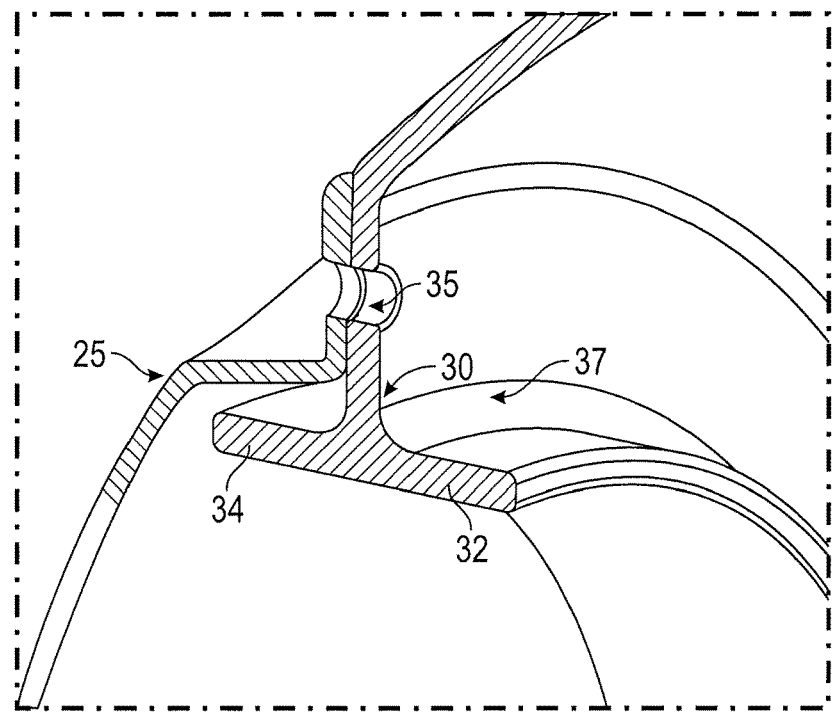
FIG. 5 is a perspective view of the forward end of the fan spinner and nosecap of the fan spinner of FIG. 2.

Returning to the return flange 30 and the illustrations of FIGS. 4 and 5, the aft flange 32 is shown. The aft flange 32 extends aft towards, for example, the aft end 18 of the spinner 15. Additionally or alternatively, the aft flange 32 may extend aft towards the fan hub 22 of the fan section 11. The aft flange 32 provides additional support during foreign object strikes in conjunction with the forward flange 34. Further, the aft flange 32 may be provided with an internal interface 37 extending radially about an internal circumference of the spinner 15.

Figure 6:
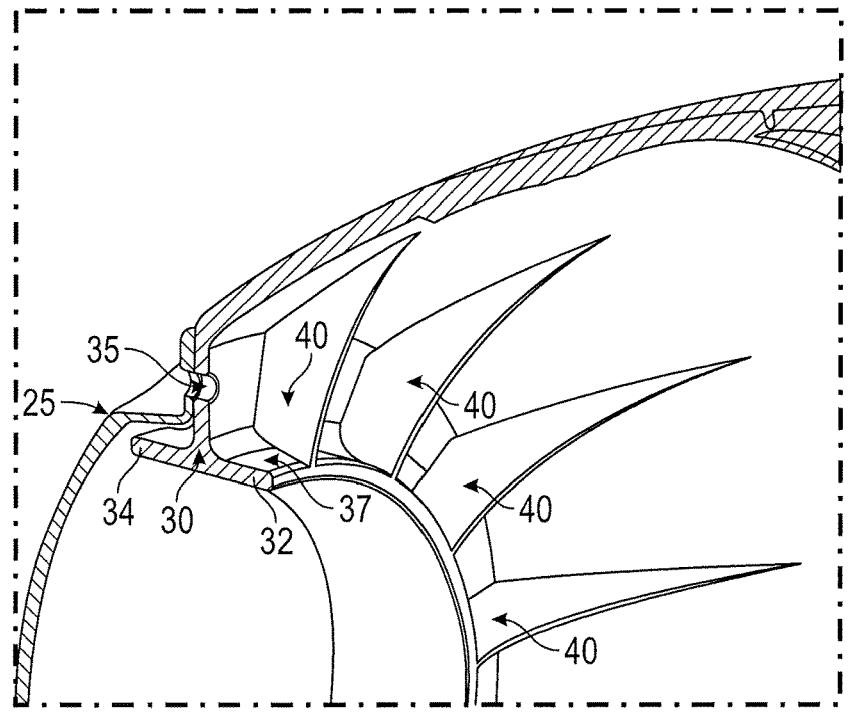
FIG. 6 is a perspective view of an alternative embodiment of the forward end of the fan spinner and nosecap of the fan spinner of FIG. 2, including an internal geometric support structure.

Turning now to FIG. 6, another embodiment of the forward end 17 of the spinner 15 is shown in a perspective view. In the embodiment, the spinner 15 includes internal geometric support 40 extending the internal interface 37 of the aft flange 32. In some examples, the internal geometric support 40 may be one or more gusset plates associated with the aft flange 32. The internal geometric support 40 may provide even further support and durability in the event of foreign object strikes to the spinner 15.

Figure 7:
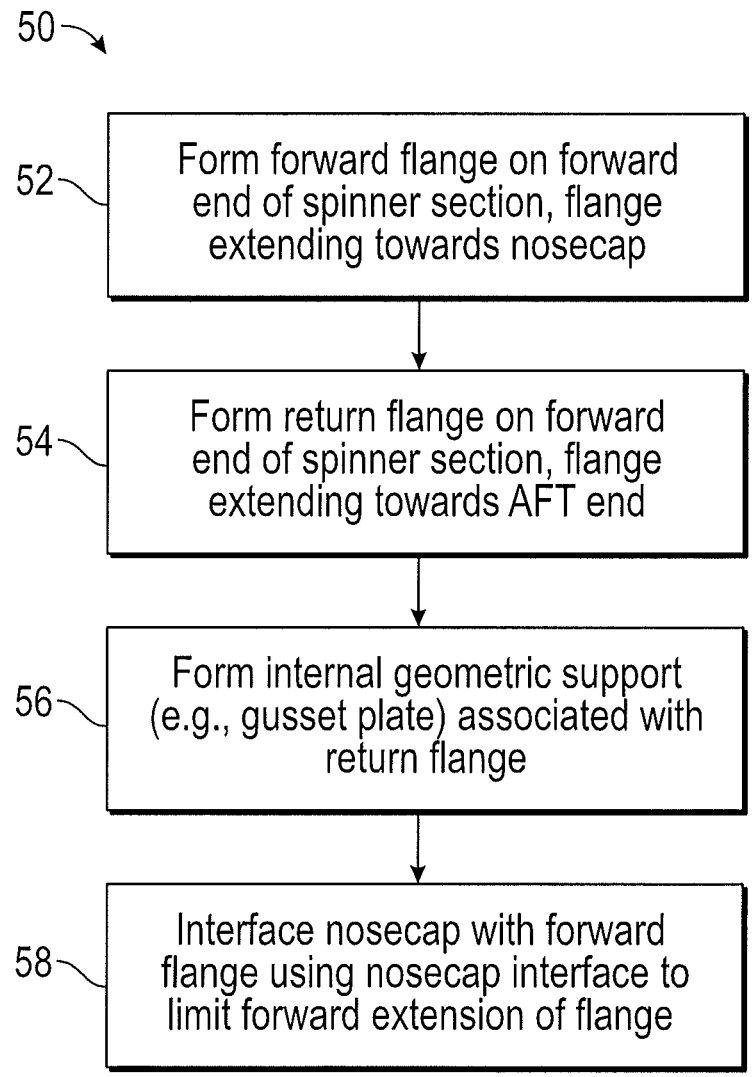
FIG. 7 is a flowchart representing a process for forming a spinner of a fan section of a gas turbine engine in accordance with the present disclosure.

With continued reference to the above mentioned elements of the gas turbine engine 10, the fan section 11, and the spinner 15 detailed in FIGS. 1-6, an example method 50 for fabricating the spinner section 15 is shown in FIG. 7. At block 52, the forward flange 34 of the return flange 30 is formed on the forward end 17 of the spinner section 15, the forward flange 34 extending towards the nosecap 25. At block 54, the aft flange 32 of the return flange 30 is formed at the forward end 17 of the spinner section 15, the aft flange 32 extending aft towards the aft end 18 of the spinner section 15. The method may include forming internal geometric support 40 (e.g., a gusset plate) associated with the return flange 30 on an internal interface 37 of the aft flange 32 (block 56). Further, the method may include interfacing the nosecap 25 with the forward flange 34 using a nosecap interface 36, the nosecap interface 36 limiting extension of the forward flange 34 (block 58).

INDUSTRIAL APPLICABILITY

From the foregoing, it can be seen that the technology disclosed herein has industrial applicability in a variety of settings such as, but not limited to, return flanges for a fan spinner of a gas turbine engine. The gas turbine engine may be used in conjunction with an aircraft for generating thrust, or for land-based applications for generating power. The teachings of the present disclosure may provide protection to the engine from foreign object strikes and/or any other wear and tear on the fan section of a gas turbine engine or the gas turbine engine as a whole.

The forward flange 34 and the aft flange 32 may be independently or concurrently formed using a compression molding process or an injection molding process. Using an aft flange 32 in conjunction with a forward flange 34 may provide greater resistance for an compression or injection molded spinner. Further, use of such aft flange technology may be desirable for increasing stiffness in a spinner when the spinner is formed from a plated polymer. Because compression molding may be a less costly means of fabricating components of the gas turbine engine, this improvement over the prior art may save costs due to the use of injection molding while still adhering to prescribed standards of durability and operability based on FAA regulation and consumer good-will. Additionally, the disclosed embodiments may be formed using any suitable forming processes known in the art.

The disclosed return flange 30 may provide increased flange stiffness, when compared to the stiffness of prior flange designs, due to the use of both the forward flange 34 and the aft flange 32 concurrently. Inclusion of internal geometric supports 40 may also provide greater stiffness. The inclusion of internal geometric supports 40 is enabled by the present return flange 30 design because said design provides the internal interface 37 of the aft flange 32. Increased stiffness at the forward end 17 of the spinner 15 may allow designers to reduce materials, for weight reduction purposes, in downstream components of the spinner 15, the fan section 11, or the gas turbine engine 10 as a whole.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all equivalents falling within the spirit and scope of the claims as well.

What is claimed is:

1. A spinner for a fan section of a gas turbine engine, the spinner configured to be receptive of a nosecap and comprising:
   an outer shell extending from a forward end to an aft end;
   the aft end configured to be installed at a forward end of a fan hub of a fan section;
   a return flange disposed at the forward end, the return flange including:
      a radially extending base portion configured to receive a nosecap thereat;
      an annular forward flange extending forward from the base portion towards the nosecap; and
      an annular aft flange extending aft from the base portion towards the aft end; and
   circumferentially spaced gusset plates extending from the outer shell to the aft flange.

2. The spinner of claim 1, wherein the aft flange provides an internal interface, the internal interface extending axially about an internal circumference of the spinner.

3. The spinner of claim 2, gusset plates located at the internal interface.

4. The spinner of claim 1, wherein the forward flange is configured to interface with the nosecap at a nosecap interface.

5. The spinner of claim 1, wherein the return flange is formed using a compression molding process.

6. A method of fabricating a spinner, the spinner having an outer shell extending from a forward end to an aft end, and a return flange associated with the forward end, the method comprising:
   forming a radially-extending base portion of the return flange configured to receive a nosecap thereat;
   forming an annular forward flange of the return flange, the forward flange extending forward from the base portion;
   forming an annular aft flange of the return flange, the aft flange extending aft from the base portion towards the aft end; and
   forming circumferentially spaced gusset plates extending from the outer shell to the aft flange;
   wherein the aft end is configured to be installed at a forward end of a fan hub of a fan section.

7. The method of claim 6, wherein the forming of the forward flange is performed using a compression molding process.

8. The method of claim 6, wherein the forming of the aft flange is performed using a compression molding process.

9. The method of claim 6, further comprising forming the gusset plates on an internal interface of the aft flange, the internal interface extending axially about an internal circumference of the spinner.

10. The method of claim 6, further configuring the forward flange to interface with a nosecap at a nosecap interface.

11. A gas turbine engine, comprising:
    a fan assembly section including a nosecap and a spinner, the spinner configured to be receptive of the nosecap and having a an outer shell extending from a forward end to an aft end, and a return flange disposed at the forward end of the spinner, the return flange including;
    a radially-extending base portion configured to receive a nosecap thereat;
    an annular forward flange extending forward from the base portion towards the nosecap and an annular aft flange extending aft from the base portion towards the aft end;
    circumferentially spaced gusset plates extending from the outer shell to the aft flange;
    a compressor section downstream of the fan assembly section;
    a combustor section downstream of the compressor section; and
    a turbine section downstream of the combustor section;
    wherein the aft end is installed at a forward end of a fan hub of the fan assembly section.

12. The gas turbine engine of claim 11, the gusset plates located at an internal interface location provided by the return flange.

13. The gas turbine engine of claim 11, wherein the nosecap includes a nosecap interface for interfacing the nosecap with the forward flange.

14. The gas turbine engine of claim 13, wherein the spinner includes geometry to facilitate mating the nosecap with the forward flange.

15. The gas turbine engine of claim 11, wherein at least one of the forward flange and the aft flange are formed using a compression molding process.

* * * * *